US011859907B2

(12) United States Patent
Della Negra et al.

(10) Patent No.: US 11,859,907 B2
(45) Date of Patent: Jan. 2, 2024

(54) VESSEL FOR CONTAINING DIRECT REDUCED IRON

(71) Applicants: Danieli & C. Officine Meccaniche S.p.A., Buttrio (IT); HyL Technologies, S.A. de C.V., San Nicolas de los Garza (MX)

(72) Inventors: Angelico Della Negra, Povoletto (IT); Federico Freschi, Udine (IT); Massimiliano Zampa, Udine (IT); Maria Teresa Guerra Reyes, Monterrey (MX)

(73) Assignees: DANIELI & C. OFFICINE MECCANICHE SPA, Buttrio (IT); HYL TECHNOLOGIES, S.A. DE C.V., San Nicolas De Los Garza (MX)

( * ) Notice: Subject to any disclaimer, the term of this patent is extended or adjusted under 35 U.S.C. 154(b) by 204 days.

(21) Appl. No.: 17/299,957

(22) PCT Filed: Dec. 4, 2019

(86) PCT No.: PCT/IT2019/050253
§ 371 (c)(1),
(2) Date: Jun. 4, 2021

(87) PCT Pub. No.: WO2020/115779
PCT Pub. Date: Jun. 11, 2020

(65) Prior Publication Data
US 2021/0333048 A1    Oct. 28, 2021

(30) Foreign Application Priority Data
Dec. 5, 2018   (IT) .......................... 102018000010817

(51) Int. Cl.
*F27D 1/16* (2006.01)
*C21B 13/12* (2006.01)
*F27D 3/10* (2006.01)

(52) U.S. Cl.
CPC ............ *F27D 1/1684* (2013.01); *C21B 13/12* (2013.01); *F27D 3/10* (2013.01)

(58) Field of Classification Search
CPC ......... C21B 13/12; C21B 7/06; F27D 1/1684; F27D 3/10; C23C 28/042
(Continued)

(56) References Cited

U.S. PATENT DOCUMENTS 4,389,724 A * 6/1983 Wooding ................. F27B 11/00
373/33
5,766,542 A * 6/1998 Berrun-Castanon .... C04B 41/86
266/286
(Continued)

FOREIGN PATENT DOCUMENTS

WO   WO2008157533   * 12/2000   ........... F27D 1/1684

OTHER PUBLICATIONS

Int'l Search Report and Written Opinion dated Feb. 6, 2020 in Int'l Application No. PCT/IT2019/050253.
(Continued)

*Primary Examiner* — Jessee R Roe
*Assistant Examiner* — Michael Aboagye
(74) *Attorney, Agent, or Firm* — Panitch Schwarze Belisario & Nadel LLP

(57) ABSTRACT

A vessel for containing direct reduced iron (DRI), such as a reactor for the production of DRI, a bin or a hopper or other container for storing or feeding DRI to melting furnaces or briquetting machines, includes at least an upper zone, defined by a first lateral wall having a substantially cylindrical tubular shape, and a discharge zone, positioned below
(Continued)

the upper zone and defined by a second lateral wall having a substantially truncated cone shape converging toward a lower discharge aperture. The second lateral wall has an internal surface at least partly lined by an internal lining.

10 Claims, 3 Drawing Sheets

(58) Field of Classification Search
USPC .......................... 266/200, 280, 286, 283, 44
See application file for complete search history.

(56) References Cited

U.S. PATENT DOCUMENTS

| | | | |
|---|---|---|---|
| 8,448,473 B2* | 5/2013 | Calderon Degollado | ................... C03B 5/2375 65/374.13 |
| 8,455,380 B2* | 6/2013 | Consales | ................. C04B 35/66 65/374.13 |
| 8,505,335 B2* | 8/2013 | Connors, Sr. | ..... C04B 35/62665 65/27 |
| 8,505,336 B2* | 8/2013 | Connors, Sr. | ......... C04B 35/106 65/27 |
| 2004/0138048 A1* | 7/2004 | Anderson | ................. C03B 5/43 65/374.13 |

OTHER PUBLICATIONS

Int'l Preliminary Report on Patentability dated Nov. 11, 2020 in Int'l Application No. PCT/IT2019/050253.

* cited by examiner

VESSEL FOR CONTAINING DIRECT REDUCED IRON

CROSS-REFERENCE TO RELATED APPLICATIONS

This application is a Section 371 of International Application No. PCT/IT2019/050253, filed Dec. 4, 2019, which was published in the English language on Jun. 11, 2020, under International Publication No. WO 2020/115779 A1, which claims priority under 35 U.S.C. § 119(b) to Italian Application No. 102018000010817, filed Dec. 5, 2018, the disclosures of each of which are incorporated herein by reference.

FIELD OF THE INVENTION

The present invention concerns a vessel, generally made of steel, which in iron and steelmaking plants is suitable to be used to contain direct reduced iron (DRI).

The vessel can also be a reactor, for the production of DRI, a bin or hopper for temporary storage, or a container for moving the DRI.

In particular the present invention concerns the presence of an internal lining inside the vessel, suitable to reduce the friction coefficient and increase the heat insulation of at least a part of the lateral wall of the vessel.

BACKGROUND OF THE INVENTION

The process to produce DRI is known, in which conglomerates of iron minerals are processed inside reactors to be converted into iron with a high degree of metallization. The iron obtained by direct reduction constitutes an ideal charge material for electric arc furnaces used for the production of high quality steels, since it contains few impurities and very little oxygen.

The iron can be used in said furnaces both directly on exit from the reactors, and also after being compacted into briquettes, by briquetting machines of a known type.

It is known that the passage of DRI from the reactors to the melting furnaces, or to the briquetting machines, can provide the temporary storage, movement or handling of the hot DRI, in containers, hoppers, bins or other vessels.

It is also known that DRI is normally produced by circulating reducing gases in counter-flow with respect to a mobile bed of particulate of iron minerals, which flows vertically due to gravity inside the reactors.

The reducing gases normally have a temperature comprised between 700° C. and 1,100° C. and the chemical reduction reactions that occur allow to remove the oxygen from the iron mineral. The chemical reactions occur in an upper part of the reactors, called reduction zone, with a substantially cylindrical shape.

Under the reduction zone, known reactors are normally provided with a truncated cone part converging toward the inside, also called discharge zone, the function of which is to convey the reduced material toward a lower exit aperture. Furthermore, the discharge zone of each reactor is configured so as to allow each particle of DRI to reach the lower exit of the reactor taking a certain time, equal for all the particles, so that they are all at the same temperature.

The DRI in contact with the walls of the reactor exchanges heat with them, and cools down, especially in correspondence with the discharge zone.

An excessive cooling of the DRI, however, does not allow to obtain good quality briquettes since, as persons of skill know, a temperature exists that constitutes the current lower limit for the correct functioning of briquetting machines.

Furthermore, it is important that the DRI exiting from the reactor is at the highest possible temperature because, as is known, the lower the temperature of the DRI that is loaded into the electric furnace, the more energy will be needed to melt it, with consequent disadvantages both in terms of energy balance and in economic terms.

It is also important to keep the highest possible temperature of the DRI during its handling from the reactor exit up to the point of use, so as to minimize heat losses both in the discharge bins of the reactor and also in the feeding bins holding hot DRI intended to feed melting furnaces or briquetting machines.

To keep the temperature of the DRI exiting for example from a reactor as high as possible, reactors are known that have the discharge zone at least partly lined with the same refractory material used for the reduction zone.

In particular, reactors are known having a layer of refractory material only in the lowest part of the discharge zone, that is, the one nearest the lower exit of the reactor, and also reactors having a layer of refractory material disposed only in the upper part of the discharge zone, that is, the one nearest the reduction zone. These known solutions, however, have the disadvantage that they are difficult to make, especially in the case of interventions on existing reactors. Furthermore, the refractory material normally used in these interventions develops a considerable force of friction with the DRI flowing from the top downward in the discharge zone of the reactor, which is greater than the force that would be generated by the contact between the DRI directly with the lateral wall of the reactor, which is normally made of metal. The greater friction considerably slows down the descent of the peripheral DRI, that is, the one in contact with the refractory material that lines the internal surface of the wall of the reactor, with a consequent damage to the efficiency of the production process.

Moreover, it is known the patent document U.S. Pat. No. 5,766,542 which discloses a reactor for the DRI production with an internal lining of the lower unloading zone made in ceramic material which is constituted at least by silica (SiO2). The lining modifies the friction coefficient of the internal surface of the unloading zone so as to facilitate the unloading of the DRI. However, this lining does not allow to significantly reduce the friction coefficient of the internal surface of the unloading zone so as to effectively improve the performance thereof.

It is also known that a lesser conicity of the discharge zone, that is, a reduction in the angle of inclination of the truncated cone wall with respect to the vertical direction, would, it is true, allow to counterbalance the slow-down effect due to the greater friction, but it would entail an increase in height of the reactor which in itself is already considerable, in the range of at least ten meters, with consequent problems in managing a plant which would become extremely bulky. Furthermore, the lengthening of the travel of the DRI inside the reactor which would be caused by heightening the latter would also cause the DRI to stay for a longer time inside the reactor, with greater possibilities of the DRI cooling.

Similar problems also apply to storage or feeding bins, to the hoppers that feed the melting furnaces or briquetting machines, or to the movement or handling bins of hot DRI which, due to their considerable sizes, can cause an excessive cooling of the DRI.

Reactors are also known which, to prevent the formation of static agglomerates of DRI inside them, are provided with mechanical means to move the DRI. The mechanical means, which in turn are normally cooled, have the disadvantage however that they cool the DRI with which they come into contact, and therefore in practice frustrate a possible insulation of the discharge zone.

Moreover, the mechanical means increase the complexity of the plant, due to their sizes and the operating conditions they have to support. Another disadvantage of reactors provided with mechanical means is that the latter, being partly outside the reactor, require sealing members which prevent the process gases from leaking in correspondence with the apertures through which the mechanical means are inserted into the reactor.

One purpose of the present invention is to obtain a vessel for DRI, such as for example a reactor to produce the same, or a bin or other similar container for the storage, movement and/or handling of hot DRI, which is provided with an internal lining of its walls able to limit the heat exchange between the hot DRI inside the vessel and the outside, and which at the same time allows to facilitate as much as possible, or impede as little as possible, the sliding of the DRI along the walls of the discharge zone, in order to obtain, at exit from the vessel, a hotter DRI compared with that obtainable with vessels of a known type.

It is also a purpose of the invention to obtain a vessel for DRI which is provided with an insulating lining in at least a part of its discharge zone, to allow a correct and optimal flow of the DRI inside it, without needing to use mechanical means to promote or improve the sliding of the DRI.

A further purpose of the present invention is to obtain a vessel for DRI, such as a reactor, a bin, a hopper or other container for the storage and movement or handling of hot DRI which is provided with an internal lining in at least a part of the wall of the discharge zone, to allow, given the same productive capacity as a vessel of a known type, to reduce the friction angle to the wall and hence to increase the conicity of the discharge zone with respect to the latter, thus allowing to reduce the height of the discharge zone and consequently that of the vessel in its entirety.

Another purpose of the present invention is to obtain a vessel for DRI which is provided with an internal lining in at least a part of the wall of the discharge zone, to allow the wall to keep itself below temperatures for which it is necessary to use a forced cooling system.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, a vessel used in the production, storage, movement or handling of DRI achieved according to the present invention, comprises at least an upper zone, defined by a first lateral wall having a substantially cylindrical tubular shape, and a discharge zone, positioned below the upper zone. The discharge zone is defined by a second lateral wall having a substantially truncated cone tubular shape, converging toward a discharge aperture, below.

The second lateral wall has an internal surface at least partly lined with an internal lining comprising at least a first layer of a composite ceramic material comprising a mixture of alumina, in the form of corundum ($Al_2O_3$), zircon oxide (zirconia—$ZrO_2$) and silica ($SiO_2$).

Advantageously, the internal lining has a surface with a surface hardness greater than or equal to 8.5 on the Mohs scale so as to reduce the friction coefficient of the second lateral wall and increase the ability of the DRI to slide toward the discharge aperture. In particular, the fact that the surface hardness of the ceramic layer of the internal lining is above this value, allows to reduce the friction coefficient between the DRI and the lateral wall of the discharge zone, both with respect to the structural steel that the latter is made of, and also with respect to a lining with refractory material of a known type.

Indeed, using the hard ceramic material allows to obtain a low surface adhesion of the moving DRI, and to have good surface stability even at high temperatures. In this way, the peripheral DRI flows more quickly through the discharge zone and the formation of static agglomerates of particles of DRI is prevented, which therefore arrive at the discharge aperture at a temperature above 700° C., that is, well above that obtainable in reactors of a known type.

Advantageously, the surface of the internal lining is also smooth, that is, it has a very low roughness, in the range of a few micron.

These surface characteristics of the ceramic material according to the present invention also have the advantage of conferring on the latter a friction angle considerably lower than that of structural steel and refractory material of a known type; this allows to increase the inclination of the lateral wall of the discharge zone without compromising the correct flow of DRI inside it. In this way, the resulting height of the discharge zone, and consequently of the whole vessel, can be advantageously reduced, at the same time reducing the problems connected to management and bulk of the plant.

The present invention also allows to line the discharge zone of an already existing vessel, such as a reactor, a bin or other similar containers, improving in them the internal flow of DRI and allowing not to use, for example in the reactors, mechanical means to assist the flow of material, with consequent advantages in economic terms and in terms of simplifying the plant.

Furthermore, the first layer of hard, smooth ceramic material allows to limit the wear to which it is subjected, and hence to keep the friction coefficient low, with consequent advantages both in technical terms, in that it allows longer working cycles, and also in economic terms, in that the production costs of the DRI are reduced.

Advantageously, the ceramic material of the first layer of internal lining comprises at least a quantity of corundum ($Al_2O_3$) comprised between 40% and 60% in weight.

Furthermore, the ceramic material also comprises at least a quantity of zircon oxide ($ZrO_2$) comprised between 25% and 40% in weight.

Furthermore, the ceramic material also comprises at least a quantity of silica ($SiO_2$) comprised between 10% and 20%.

It is also within the spirit of the invention to provide that the first layer of internal lining is made in the form of modular elements, for example having the shape of a parallelepiped block, disposed adjacent to each other and separated by an interposition layer made of an elastically deformable material resistant to temperatures of more than 700° C., such as for example a high density refractory or an insulator.

According to a further characteristic of the present invention, the internal lining also comprises a second layer of insulating material, interposed between the first layer and the lateral wall of the discharge zone.

A further characteristic according to the present invention provides that the internal lining also comprises a third layer of insulating material, interposed between the second layer and the lateral wall of the discharge zone.

The heat insulation obtained with the internal lining of the discharge zone keeps the temperature of the DRI high, which advantageously reaches the discharge aperture at a temperature of more than 700° C., which is optimum for the subsequent workings of melting in the electric arc furnace or for briquette making.

Furthermore, the lateral wall of the discharge zone is insulated with respect to the inside, and consequently its temperature remains under the limit (about 100° C.) above which a forced cooling is necessary. The advantage is therefore obtained that, since a cooling system for the lateral wall is not needed, the vessel according to the present invention is simplified and less expensive.

BRIEF DESCRIPTION OF THE DRAWINGS

These and other characteristics of the present invention will become apparent from the following description of a preferential form of embodiment, given as a non-restrictive example with reference to the attached drawings wherein.

DETAILED DESCRIPTION OF ONE FORM OF EMBODIMENT

Figure 1:
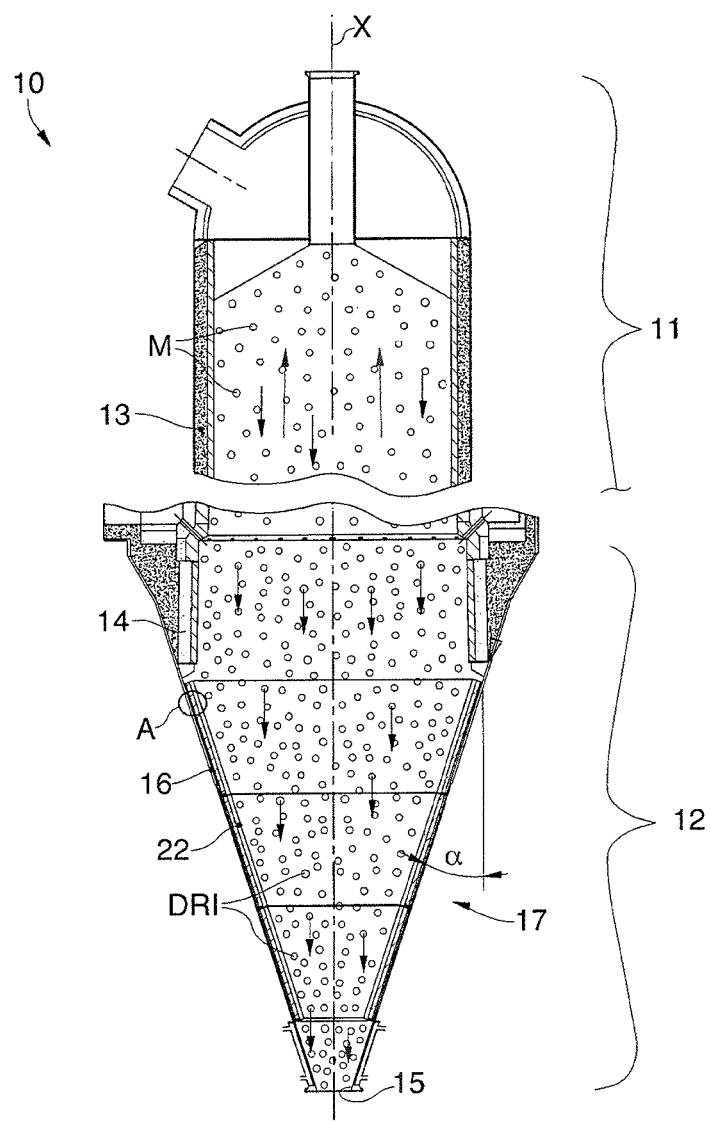
FIG. 1 is a section view of a vessel made according to the present invention and used as a reactor for the production of direct reduced iron.

With reference to FIG. 1, a vessel according to the present invention, which in the example shown here is a reactor 10 for the production of direct reduced iron (DRI) has a shape substantially axial-symmetrical with respect to an axis X, vertical.

In its upper part, the reactor 10 comprises an upper zone, called reduction zone 11, inside which reduction gases at temperatures comprised between 700° C. and 1,100° C. flow in counter-flow with respect to a bed of charge material M consisting of iron minerals in granular form that falls due to gravity from the top to the bottom.

In the reduction zone 11, defined by a first lateral wall 13 having a substantially cylindrical tubular shape, the reduction reactions that transform the charge material M into DRI take place.

Under the reduction zone 11, the reactor 10 comprises a lower zone, called discharge zone 12, communicating with the reduction zone 11 in correspondence with the lower end 14 of the latter. The discharge zone 12 has a truncated cone shape defined by a second lateral wall 16 converging toward the axis X and inclined with respect thereto by an angle a which in this case is equal to about 12°.

The function of the discharge zone 12 is to convey the particles of DRI toward a discharge aperture 15, located at its lower end. From the discharge aperture 15 the DRI exits from the reactor 10 and can be conveyed directly toward an electric arc furnace to be melted, or to a briquetting machine, to be shaped into briquettes for subsequent storage or transport.

In the portion of reactor 10 comprised between the lower end 14 of the reduction zone 11 and the lower zone 17 of the discharge zone 12, the second lateral wall 16 is provided with an internal lining 22.

Figure 2:
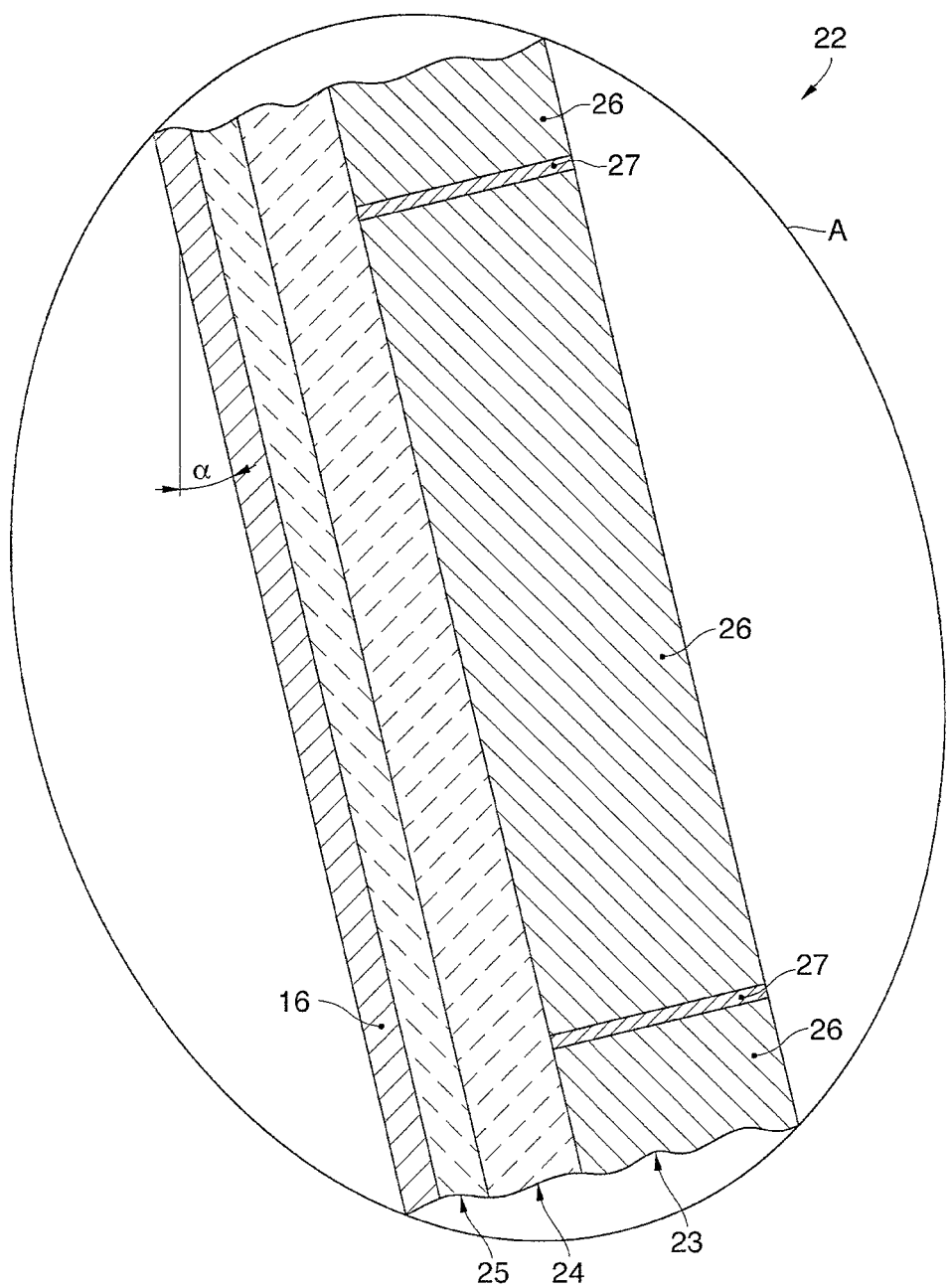
FIG. 2 is an enlargement of detail A in FIG. 1.

In the form of embodiment shown in FIG. 2, the internal lining 22 comprises a first layer 23, disposed toward the inside of the discharge zone 12, a second layer 24, under the first layer 23, and a third layer 25, interposed between the second layer 24 and the second lateral wall 16.

The first layer 23 is made of a composite ceramic material comprising a mixture of alumina, in the form of corundum ($Al_2O_3$), zircon oxide (zirconia—$ZrO_2$) and silica ($SiO_2$). These oxides are combined in proportions such as to confer on the first layer 23 a surface hardness greater than or equal to 8.5 Mohs.

In a preferential form of embodiment, the first layer 23 contains between 48% and 53% in weight of corundum, between 30% and 33% of zircon oxide and between 13% and 17% of silica.

In this way, a material is obtained with the desired hardness, density comprised between 3,000 kg/m3 and 4,000 kg/m3 and conductivity comprised between 3.5 W/mK and 5.0 W/mK.

The considerable hardness and high surface finish obtainable for this material, for example using sintering production techniques, allow the first layer 23 to have a low friction coefficient, and also a friction angle considerably less than that of the refractories normally used for lining the second lateral wall 16 and than that of the steel the latter is normally made of.

Figure 3:
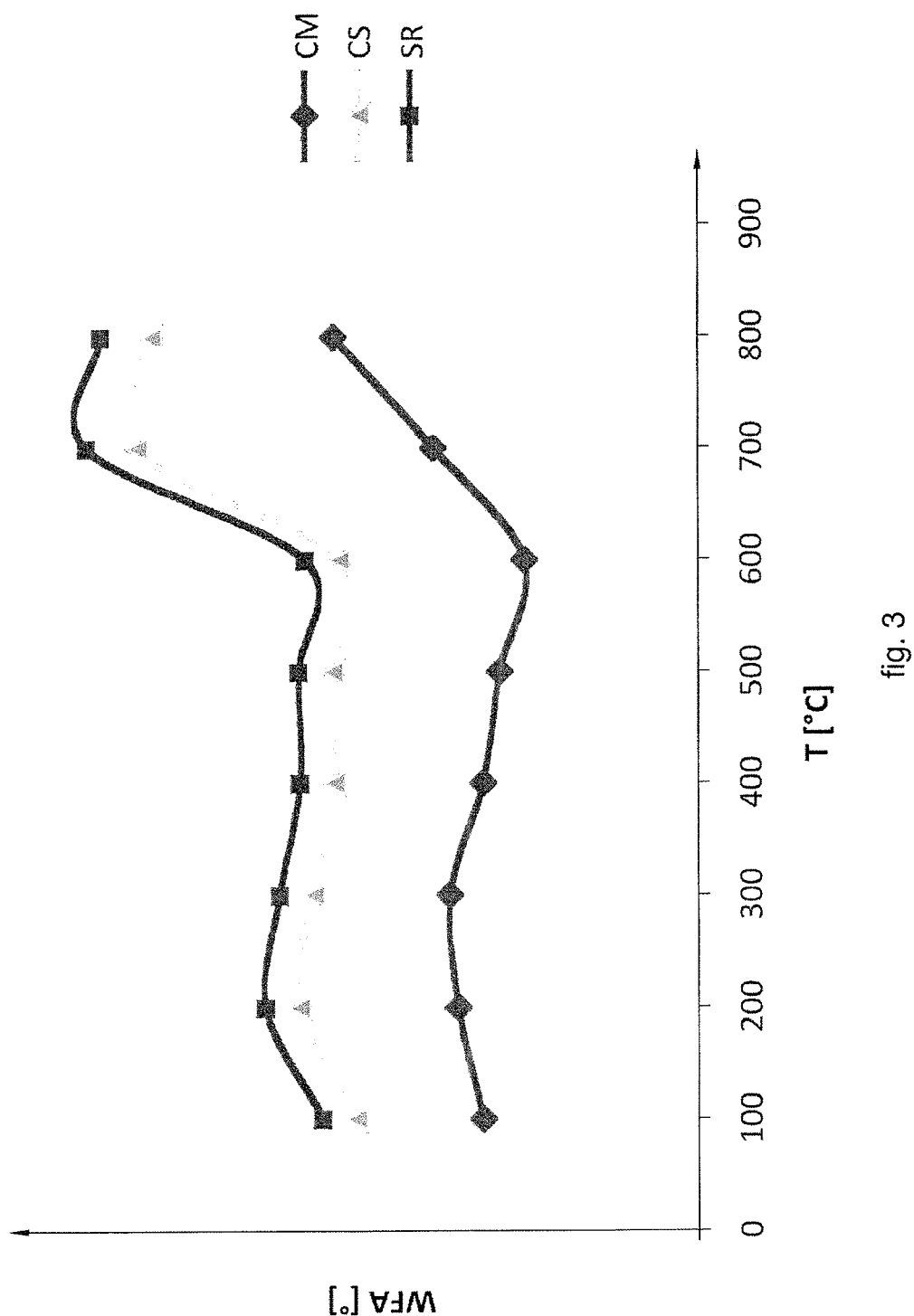
FIG. 3 is a graph comparing the friction angle of different materials in relation to the temperature.

To give an example, FIG. 3 shows, for the three different materials cited above, a graph of the development of the wall friction angle (WFA) as the temperature (T) increases, where SR indicates standard refractory, CS indicates carbon structural steel, and CM indicates the ceramic material the first layer 23 of the internal lining 22 is made of.

It should be noted that, along nearly the whole range of temperatures considered, the value of the friction angle of the ceramic material CM remains between about 50% and about 60% of the values relating to the angles of friction of carbon steel CS and standard refractory SR, which between them differ only by 2-3°.

The difference between the value of the friction angle of the ceramic material CM and those of the carbon steel CS and standard refractory SR is highest between 600° C. and 700° C., a range in which the first goes below 50% of the second and below 45% of the third.

Since the friction angle of the second lateral wall 16 is inversely proportionate to the maximum inclination that it can have in the discharge zone 12, the first layer 23 of the internal lining 22 allows to achieve considerably higher inclinations. This has a positive effect due to the fact that the greater inclination of the second lateral wall 16 implies a proportionate reduction in the height of the reactor 10.

In particular, the maximum angle of inclination of the second lateral wall 16 usable with carbon steel is 12-13°, while with a standard refractory it goes down to 9°. Subject to solving other problems that come into play at angles of more than 13°, the first layer 23 of the internal lining 22 would allow to achieve an inclination of the second lateral wall 16 even much higher than 13°, while still keeping the speed of descent of the DRI substantially unchanged, and therefore not affecting the efficiency of the process.

The first layer 23 (FIG. 2) is advantageously made with modular elements, for example tiles or blocks 26, substantially parallelepiped and smooth on the surface. The blocks 26 are laid adjacent and have a minimum thickness of 40 mm, advantageously comprised between 45 mm and 50 mm. To allow the first layer 23 to deform under the thermal loads without causing cracks, a thin layer of deformable material 27, resistant to the high temperatures of the process, for example a high density refractory or an insulator, can be used to surround the blocks 26 and separate them from each other.

The second layer 24, under the first layer 23, has a minimum thickness of 45 mm, advantageously comprised between 50 mm and 80 mm.

In this case, the second layer is made of a silico-aluminous insulating material, with a density comprised between about 2,000 kg/m3 and about 3,000 kg/m3 and a conductivity comprised between about 1.4 W/mK and about 1.7 W/mK. The main function of the second layer 24 is to act as a binder between the first layer 26 and the third layer 25 but, where necessary, it can also be used as a filling to contribute to the heat insulation.

The third layer 25, interposed between the second layer 24 and the second lateral wall 16, has the main function of contributing to the heat insulation of the discharge zone 12 with respect to the outside. The third layer 25, in the example given here, is made of a silica-based insulating material, but it can also be made of other insulating materials and have other thicknesses, in proportion to the degree of insulation desired.

In particular, also in order to reach a suitable compromise between thickness and insulating capacity of the third layer 25, the value of conductivity of the latter is advantageously comprised between 0.01 W/mK and 0.1 W/mK.

The speed at which the DRI passes through the discharge zone 12 and the insulation achieved by the internal lining 22 allow the DRI to keep a good part of its heat energy, thus maintaining, in correspondence with the exit aperture 15, a temperature of more than 700° C.

It is clear that modifications and/or additions of parts may be made to the vessel as described heretofore, which has been identified by way of example as a reactor 10, without departing from the field and scope of the present invention.

Indeed, this form of embodiment has been described merely by way of a non-restrictive example, and the considerations made in the description above are to be understood as valid also for other types of vessels suitable for containing hot DRI. Alternative types of vessels may be for example storage bins or hoppers, or other containers used for moving the DRI from the reactor to user devices such as melting furnaces or briquetting machines, in order to feed them.

In fact, in all these vessels, as in the reactor 10, it is advantageous that the temperature and the slidability of the DRI are high.

It is also clear that, although the present invention has been described with reference to some specific examples, a person of skill in the art shall certainly be able to achieve many other equivalent forms of apparatus, having the characteristics as set forth in the claims and hence all coming within the field of protection defined thereby.

The invention claimed is:

1. A vessel for containing direct reduced iron (DRI), comprising at least an upper zone (11), defined by a first lateral wall (13) having a substantially cylindrical tubular shape, and a discharge zone (12), positioned below said upper zone (11) and defined by a second lateral wall (16) having a substantially truncated cone shape converging toward a lower discharge aperture (15), said second lateral wall (16) having an internal surface at least partly lined by an internal lining (22), wherein said internal lining (22) comprises at least a first layer (23) made of tiles or blocks (26) having a minimum thickness of 40 mm, of a composite ceramic material comprising a mixture of alumina, in the form of corundum (Al2O3), zircon oxide (zirconia—ZrO2) and silica (SiO2), said first layer of the internal lining (22) having a surface with a surface hardness greater than or equal to 8.5 on the Mohs scale so as to reduce the friction coefficient of said second lateral wall (16) and increase the ability of said DRI to slide toward said discharge aperture (15), wherein said first layer (23) has a density comprised between 3,000 kg/m3 and 4,000 kg/m3 and a conductivity comprised between 3.5 W/mK and 5.0 W/mK, wherein said ceramic material comprises at least a quantity of corundum (Al2O3) comprised between 40% and 60% in weight, wherein said ceramic material comprises at least a quantity of zircon oxide (ZrO2) comprised between 25% and 40% in weight, and wherein said ceramic material comprises at least a quantity of silica (SiO2) comprised between 10% and 20%.

2. The vessel as in claim 1, wherein said first layer (23) has a thickness greater than to 40 mm.

3. The vessel as in claim 1, wherein said first layer (23) comprises a plurality of modular elements (26), disposed adjacent to each other and separated by an interposition layer (27) made of an elastically deformable material and resistant to temperatures of above 700° C.

4. The vessel as in claim 3, wherein said elastically deformable material is a high-density refractory or an insulator.

5. The vessel as in claim 1, wherein said internal lining (22) also comprises at least a second layer (24) of insulating material, interposed between said first layer (23) and said second lateral wall (16) of said discharge zone (12), to connect said first layer (23) and said second lateral wall (16) and to contribute to the heat insulation of the latter.

6. The vessel as in claim 5, wherein said second layer (24) has a thickness greater than or equal to 45 mm.

7. The vessel as in claim 5, wherein said internal lining (22) also comprises a third layer (25) of insulating material, interposed between said second layer (24) and said second lateral wall (16) of said discharge zone (12), to contribute to the heat insulation of said discharge zone (12) with respect to the outside.

8. The vessel as in claim 1, wherein said upper zone (11) comprises a reduction zone of a reactor for the production of direct reduced iron (DRI).

9. The vessel as in claim 1, wherein the second lateral wall (16) of said discharge zone (12) forms an inclination angle (a) greater than 13° with respect to the vertical.

10. The vessel as in claim 1, wherein the minimum thickness of the tiles or blocks (26) is between 45 mm and 50 mm.

* * * * *